Feb. 12, 1963    J. B. McCLELLAND    3,077,336
WEED PULLER
Filed Aug. 29, 1960    3 Sheets-Sheet 3
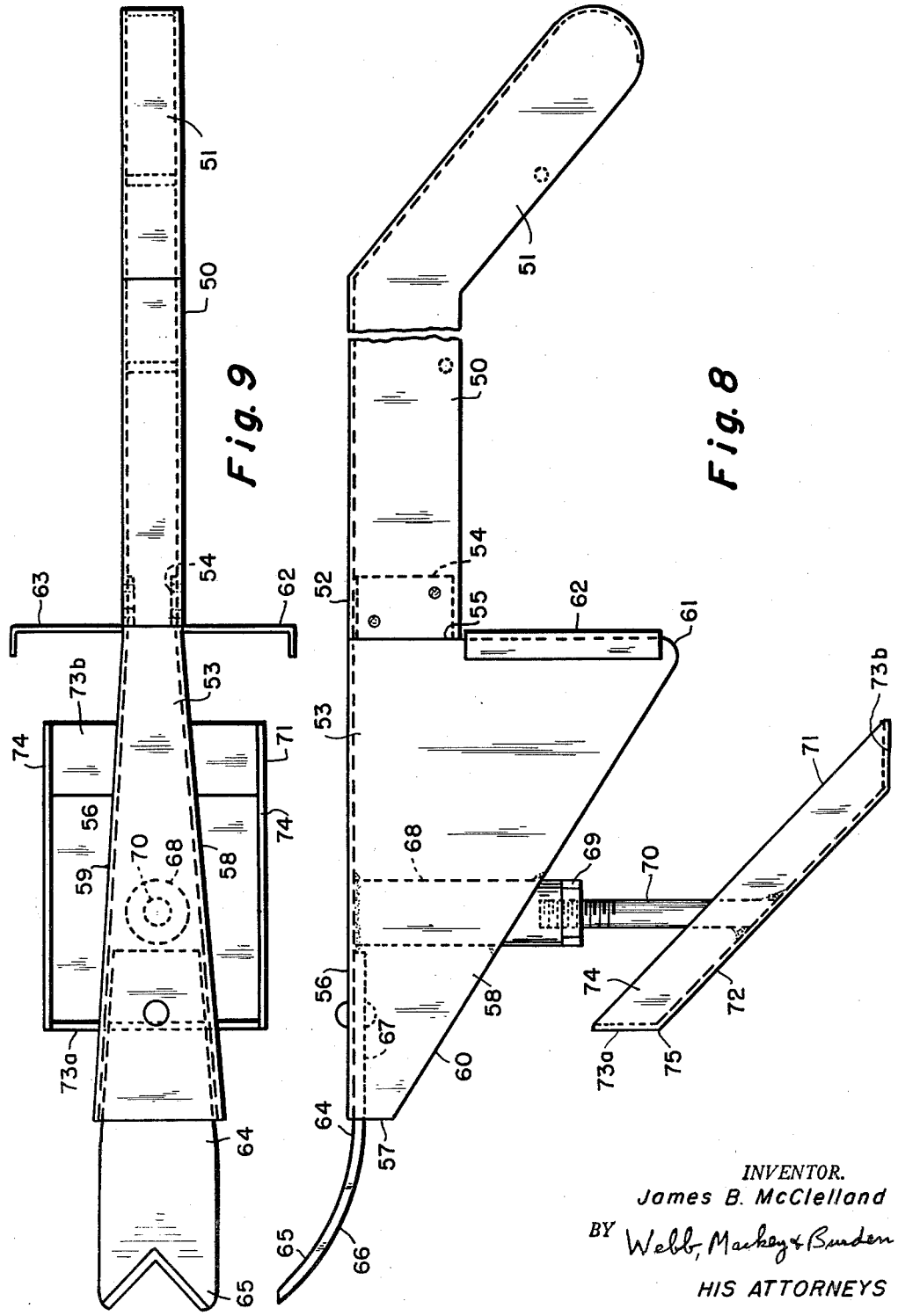
INVENTOR.
James B. McClelland
BY Webb, Mackey & Burden
HIS ATTORNEYS

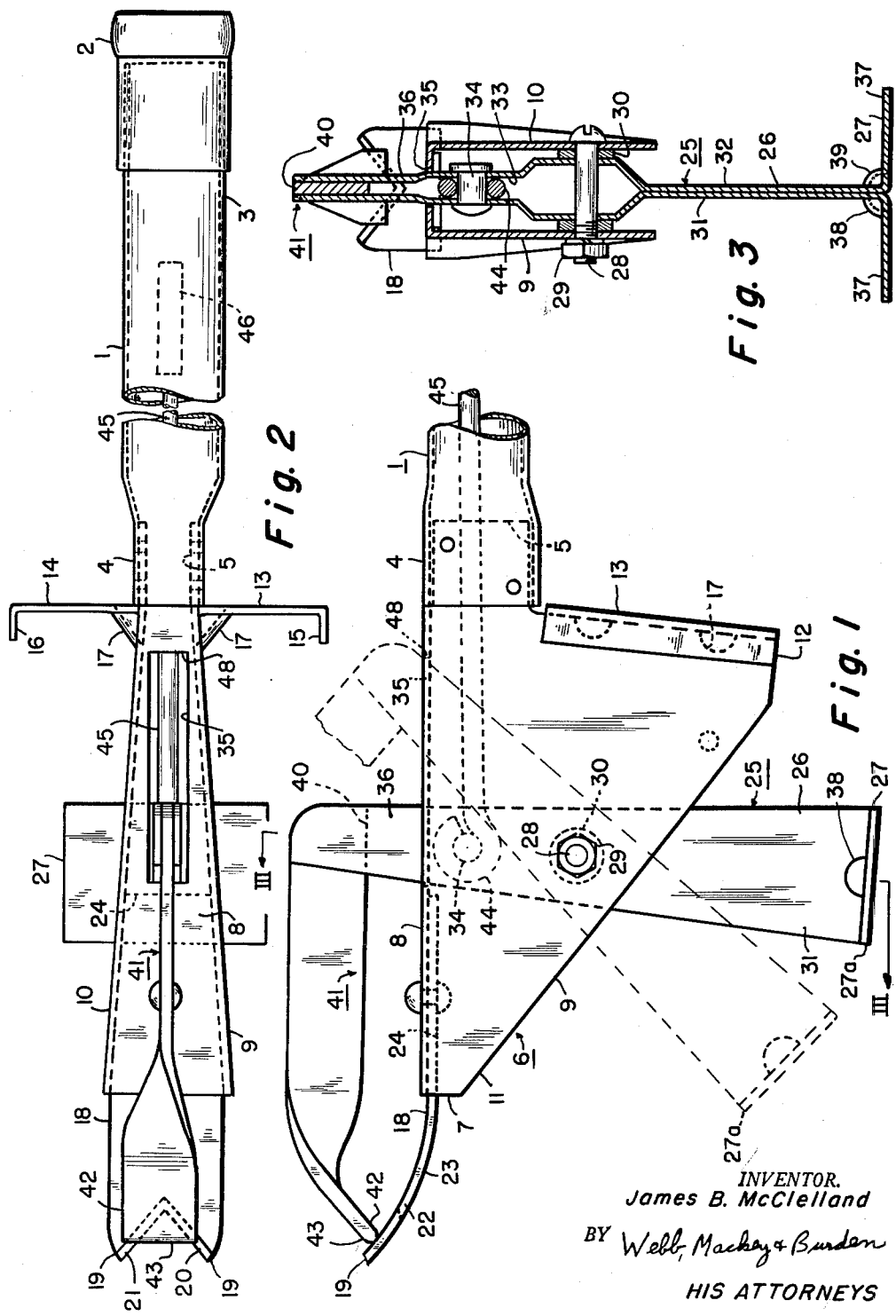

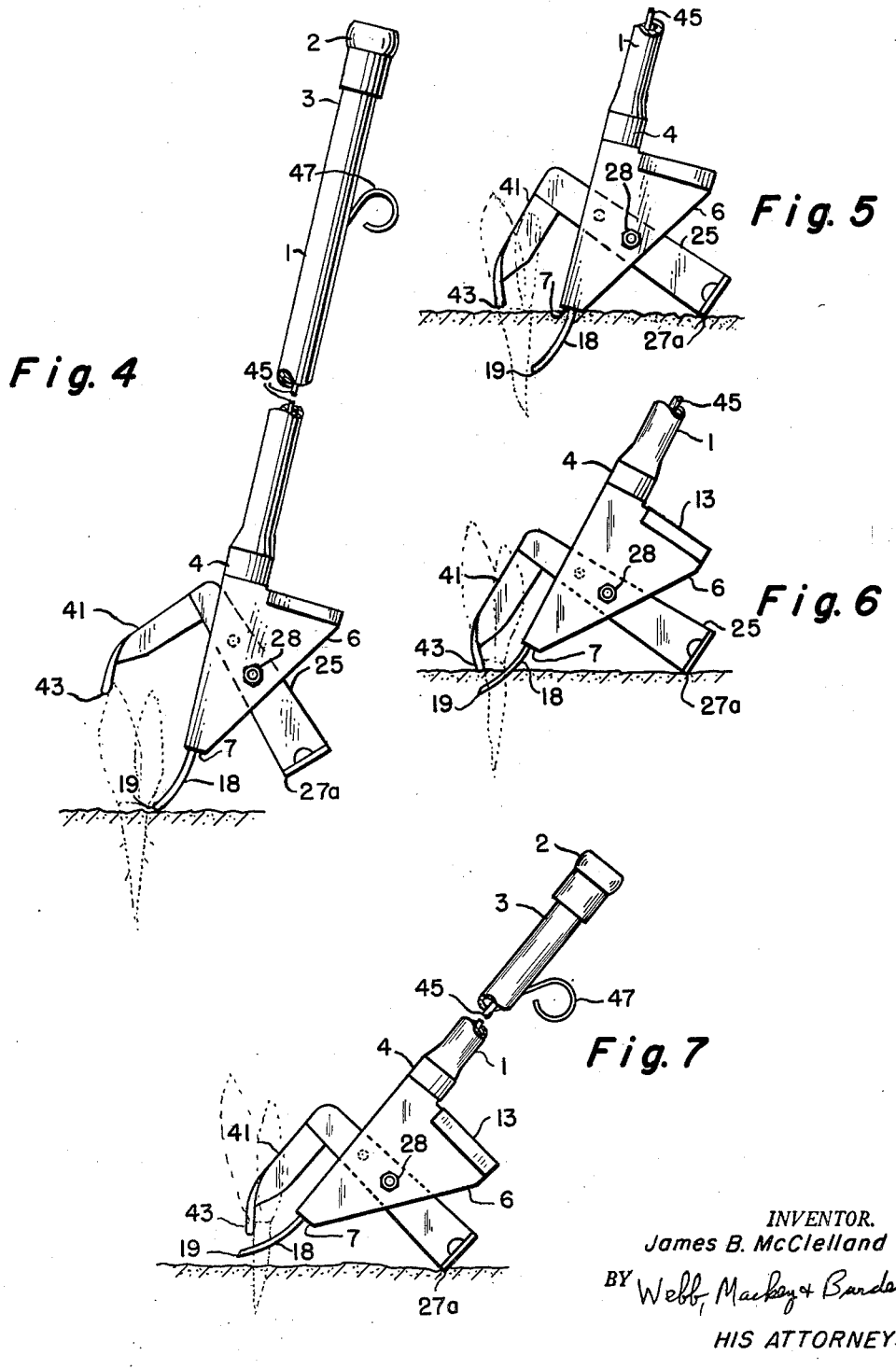

United States Patent Office 3,077,336
Patented Feb. 12, 1963

3,077,336
WEED PULLER
James B. McClelland, 805 N. McKean St.,
Kittanning, Pa.
Filed Aug. 29, 1960, Ser. No. 52,645
2 Claims. (Cl. 254—132)

This invention relates to a weed puller and more particularly to a weed puller which can be operated with an easy push motion by a person from a standing position without need to bend over, kneel, sit or squat down to remove weeds.

Heretofore, most weed extractors or removers have been forked or bifurcated diggers which required an operator to sit, squat or kneel on a lawn, flower bed, etc. when loosening and lifting the weeds from their place of growth. While these weed removers effectively dig out weeds, the operators, in many instances, were forced to work from awkward and uncomfortable positions, thereby tiring easily.

I have invented a weed puller which enables the operator to remove weeds from a standing position with an easy downward push upon its handle and/or against a transverse foot flange. Specifically, my weed puller comprises an elongated handle with a head connected to the lower end of the handle. A fork member is affixed to the head and projects outwardly therefrom with its tines located forwardly of the head. Pivotally mounted upon the head rearwardly of the tines is a cleat member which has a part extending downwardly from the head to a foot for resting upon a surface. The foot is a fulcrum for the fork member, head and handle in removal of weeds from their place of growth.

The cleat member has an arm angularly joined thereto at a place where said pivot mounting is intermediate the foot and the place. The arm extends toward the tines of the fork member and has at its outer end, positioned for engagement with the fork member a jaw which holds a weed upon the fork member after its loosening and removal from turf.

Removal of a weed from its place of growth results from inserting the tines into the turf beside the weed with the jaw and fork member spaced apart and then pushing downwardly upon the handle to pivot the head, handle and fork member about the cleat member which then rests upon the turf, thus causing the fork member, head and handle to travel through an arc from open position whereat the fork member and jaw are spaced apart to a closed position whereat the jaw contacts and holds a weed upon the fork member. In this travel, the fork member and the jaw move into gripping relation with the weed which is removed from its place of growth by pivoting of the puller with the fork member and jaw closed upon the weed about the foot in contact with the turf to produce travel of the puller through a second arc in the same direction as the first mentioned arc and extraction of the weed.

Connected to the cleat member is a means such as a pull rod for moving the jaw out of engagement with the weed held upon the fork member to bring the fork member and jaw to open position and to release the weed.

In the accompanying drawings I have shown two preferred embodiments of my invention in which:

FIGURE 1 is a side elevation view partly in section of one embodiment of my weed puller showing in solid lines the jaw of the arm of the cleat member in engagement with the fork member and showing in dash lines the jaw in open position;

FIGURE 2 is a plan view of the weed puller of FIGURE 1;

FIGURE 3 is a section view along the line III—III of FIGURE 1;

FIGURE 4 is a side elevation view showing the weed puller of FIGURE 1 in starting position for removal of a weed;

FIGURE 5 is a view similar to FIGURE 4 with the tines inserted into the turf beside the weed to be removed;

FIGURE 6 is a view similar to FIGURE 4 showing the fork member and jaw in gripping relation with the weed and with the tines still in the turf;

FIGURE 7 is a view similar to FIGURE 4 showing the weed extracted from the turf;

FIGURE 8 is a side elevation view of a second embodiment of my weed puller; and

FIGURE 9 is a plan view of the weed puller of FIGURE 8.

Referring to FIGURES 1-7 inclusive, my weed puller comprises an elongated tubular shaft or handle 1 made from a rigid material such as steel, stainless steel, aluminum, etc. with a gripper sleeve 2 on its upper end 3. The lower end 4 of the shaft necks down to receive a throat section 5 of a head 6 which is riveted thereto and extends into the neck-down end of the shaft. The head 6 has an outer end 7, a top plate 8 and downwardly depending parallel side walls 9 and 10 integral with the top plate and on each side thereof to form a hollow housing open at the bottom and along the bottom edges of the side walls. Preferably the head is either a single casting or a fabrication from a single sheet or plate of steel, stainless steel, or aluminum.

As shown in FIGURE 1, the bottom edges 11 of the side walls incline downwardly and rearwardly from the outer end 7 to an intersection with a bottom edge 12 of transverse flanges 13 and 14. The transverse flanges 13 and 14 project laterally from the side walls and extend upwardly to the throat 5 of the head and the outer ends of the flanges have forwardly turned lips 15 and 16 integral therewith. At the intersection of each flange with its side wall is a triangular shaped reinforcing rib 17.

Affixed to the outer end of the top plate 8 of the head is a fork member 18 disposed in a plane parallel to the longitudinal axis of the shaft and having its tines 19 forward of the outer end 7 of the head. Preferably, the inside edges 20 and 21 of the tines are a blade or cutting surface which assists in removal of weeds.

As shown in FIGURE 1, that part 22 of the fork member which terminates in the tines curves outwardly and upwardly when the puller is in a horizontal position so that its under or bottom side 23 forms a convex surface relative to the underside of that part 24 of the fork member affixed to the stop plate. Such a curved shape of the fork member enables the tines to easily engage the underside and roots of a weed and lift and remove it during travel through short upward arcs as will be described more fully hereinafter.

Pivotally mounted on the head between the side walls 9 and 10 and rearwardly of the tines 19 is a cleat member 25 whose lower part 26 extends downwardly from the bottom edges 11 of the side walls to a foot 27. A bolt 28 which runs through each side wall and the cleat member and which is held in position by a nut 29 and a washer 30 forms a pivot mounting for the cleat member. The cleat member is made from two parallel straps 31 and 32 of suitable material abutting each other side by side and running from the foot 27 up to a point below the pivot mounting where they separate to form a receptacle 33 for a transversely disposed pin 34 supported by the straps. The straps retain their spaced apart relationship above the receptacle and project up through a longitudinal slot 35 in the top plate 8 of the head to form the upper end 36 of the cleat member. The foot is formed by right angle flanges 37 extending laterally from the bottom of each strap. Reinforcing ribs 38 and 39 engage the bottom flanges and straps at their intersection with each other.

As shown in FIGURE 1, the upper end 36 of the cleat member 25 has one end 40 of an arm 41 angularly joined thereto and disposed between the two straps. The intersection of the arm with the cleat member forms an angle of almost 90° and both the arm and cleat member lie in the same plane. The arm extends forwardly towards the tines and carries a jaw 42 at its outer end 43 for engagement with a weed disposed upon the tines of the fork member. In solid line, the jaw and fork member are shown in closed position or in engagement with each other whereat a weed is held upon the tines by contact of the jaw therewith. In dash lines, the jaw and fork member are shown in open position with the jaw and tines spaced apart.

Connected to the pin 34 located in the receptacle 33 formed by the straps 31 and 32 of the cleat member upwardly from the pivot mounting is one end 44 of a pull rod 45 which is located inside the shaft. The pull rod runs longitudinally inside the shaft towards the gripper sleeve 2 and then bends toward and extends out through a slot 46 in the wall of the shaft terminating in a loop 47. The loop is adapted to receive a finger of an operator who, by pulling upwardly on the rod or towards the gripper sleeve causes the cleat member to pivot and travel through a clockwise arc, thus moving the jaw to open position. By tightening the bolt 28 and nut 29 upon the washer 30, I provide a friction between the head and the cleat member which assists maintenance of the jaw and fork member in open and closed positions.

End 48 of the slot 35 in the top plate 8 is positioned so that the cleat member engages that part of the top plate 8 forming the end 48 to define open position (as shown in dash line in FIGURE 1). Of course, closed position is defined by engagement of the jaw either with a weed upon the fork member or with the fork member itself.

The foot 27 of the cleat member is a fulcrum about which the fork member, head and shaft pivot as a unit in extracting a weed from the turf. To remove a weed, the jaw and fork member are moved to open position and the tines are placed upon the turf beside the weed with the shaft or handle at less than a right angle to the turf with the foot of the cleat member up off of the turf. Then, the operator pushes downwardly upon the shaft to force the tines into the turf alongside the roots of the weed to bring the foot into contact with the turf with the jaw in open position (FIGURE 5). The outer end 7 of the head 6, the length of the lower part 26 of the cleat member 25 and the position of end 48 of the slot are so located and arranged that the forward end 27a of the foot 27 and the outer end 7 lie in a transverse plane almost perpendicular to the longitudinal axis of the shaft 1 when the jaw and fork member are in open position. Thus, when the tines are inserted into the turf (FIGURE 5), the forward end 27a engages the turf with the almost perpendicular disposition of the forward end 27a and the outer end 7 allowing for a small amount of digging in of the foot into the turf. Next, the operator pushes downwardly upon the handle with one arm and/or against the transverse flange with his foot to pivot the fork member, head and shaft about the cleat member and swing the fork member through a short, upward, clockwise arc to bring the jaw and fork member into gripping relation with the weed. In this relation, the jaw engages the weed and the fork member and jaw are in closed position and the tines are still in the turf being moved a short distance to get closer and more under the roots of the weed (FIGURE 6). Finally, to extract the weed, the operator swings downwardly on the handle and/or the transverse flange to pivot the puller about the forward end 27a of the foot, thus causing the fork member and jaw in gripping relation to travel a second upward arc in the same direction as the first mentioned arc. In traveling the second arc, the tines come up out of the turf bringing the weed and its roots therealong (FIGURE 7).

After the jaw and fork member have moved to closed position, the pivot point of the puller shifts from the bolt 28 to the forward end 27a of the foot.

To free the weed from the puller, the operator lifts the puller from the ground and pulls back upon the rod to open the jaw after the fork member has been swung to a position over a basket or other collector for weeds. Thus it is clear that an operator of my invention can easily remove weeds from their place of growth while working from a standing position by easy push motions of his arm and/or foot. Furthermore, the extracted weed can be easily and quickly transferred to a basket therefor without later having to stoop over to pick up or rake up weeds. Not only does the cleat member, jaw and fork combination avoid picking up extracted weeds but also assists in taking out roots by gripping the weed with the jaw upon its leaf part and the tines of the fork member in the turf and in engagement with the roots.

FIGURES 8 and 9 show a second embodiment of my weed puller comprising an elongated tubular shaft 50, U-shaped in cross section, with a handle 51 at its upper end. Affixed to the lower end 52 of the shaft is a head 53 with a throat 54 at its rear end 55 fitting into the lower end 52 and being riveted thereto. The head 53 is similar to the head 6 with a top plate 56, an outer end 57 and downwardly depending parallel side walls 58 and 59 integral with the top plate and on each side thereof to form a hollow housing open at the bottom and along the bottom edges 60 of the side walls.

The bottom edges 60 incline downwardly and rearwardly from the outer end 57 to an intersection with a bottom edge 61 of transverse flanges 62 and 63 identical to the transverse flanges of the embodiment of FIGURES 1–3 inclusive.

Affixed to the outer end of the top plate 56 of the head 53 is a fork member 64 with tines 65 located forwardly of the outer end 57 of the head. As shown in FIGURE 8, the part 66 of the fork member 64 terminating in the tines, curves outwardly and upwardly as the fork member 18 to form a convex shaped underside surface relative to the underside of the part 67 of the fork member 64 affixed to the top plate.

Rigidly mounted upon the head 53 rearwardly of the fork member, transversely to the longitudinal axis of the shaft 50, and between the side walls 58 and 59 is a downwardly depending sleeve 68 which extends below the bottom edges 60 of the side walls. The lower end of the sleeve 68 carries a threaded washer 69 which receives a threaded rod 70 projecting downwardly therefrom. The rod 70 rigidly supports a rectangular shoe or foot 71 which functions as a fulcrum for the weed puller. The shoe is adjustable vertically by turning of the rod in the washer.

As shown, the shoe comprises a bottom plate 72 disposed transversely of the rod, an outwardly and diagonally upwardly sloping front end 73a and rear end 73b and sides 74 with its mounting upon the rod 70 such that the bottom plate inclines downwardly and rearwardly from its forward end 75.

Operation of this second embodiment is similar to that of the first embodiment in that it is placed in the position illustrated in FIGURE 4 with the tines alongside a weed and the shaft 50 substantially normal to the turf. Then, the tines are pushed into the turf beside the weed until the outer end 57 of the head contacts the turf. Next, the operator pushes downwardly upon the handle until the forward end 75 of the bottom plate 72 and/or the front end 73a engage the turf, whereupon further downward push causes the shoe to function as a fulcrum about which the weed puller pivots whereby the fork member loosens and extracts a weed while traveling through an upward arc. In extraction of a weed, the operator may place his foot upon the transverse flanges 62 and 63 to assist removal thereof.

My weed puller has a simple and rugged structure which lends itself to easy manufacture and assembly together with an ability for long life.

While I have shown and described present preferred embodiments of my invention, it is to be understood that it may be otherwise embodied within the scope of the appended claims.

I claim:

1. A weed puller comprising an elongated handle, a head connected to the lower end of said handle, a fork member having tines being affixed to said head and projecting forwardly therefrom, said head having an outer end defined by that part from which said fork member projects, said outer end extending transversely of a longitudinal axis of said head to form a stop and being disposed to engage an upper surface of turf to avoid penetration thereof by said head, a cleat member having a pivot mounting upon said head rearwardly of said tines, having a lower part extending downwardly from said head to a foot for resting upon said surface and having an upper part extending upwardly from said pivot mounting, an arm angularly joined to said upper part of said cleat member, said arm extending toward said tines and having a jaw member at its outer end positioned for engaging and holding upon said fork member a weed during removal from said turf, pivoting of said head, handle and fork member about said cleat member causing said fork member, head and handle to travel through an arc from an open position whereat said fork member and jaw are spaced apart to a closed position whereat said jaw engages a weed upon said fork member, means on said head positioned for engagement with said cleat member to define said open position, said foot being disposed upon its cleat member so that a forward end thereof is in engagement with said surface when said jaw is open and said fork member is entered into the turf at the start of extraction of a weed, said lower part of said cleat member having a length such that when said jaw and fork member are in said open position, said forward end of said foot and said outer end of said head lie in a plane substantially perpendicular to the longitudinal axis of said head, said outer end of said jaw member in open position lying above said plane.

2. In a weed puller having an elongated handle, a head connected to the lower end of said handle and a fork member having tines being affixed to said head and projecting forwardly therefrom, the invention comprising an outer end on said head defined by that part from which said fork member projects, said outer end extending transversely of a longitudinal axis of said head to form a stop and being disposed to engage an upper surface of turf to avoid penetration thereof by said head, a cleat member having a pivot mounting upon said head rearwardly of said tines, having a lower part extending downwardly from said head to a foot for resting upon said surface and having an upper part extending upwardly from said pivot mounting, an arm angularly joined to said upper part of said cleat member, said arm extending toward said tines and having a jaw member at its outer end positioned for engaging and holding upon said fork member a weed during removal from said turf, pivoting of said head, handle and fork member about said cleat member causing said fork member, head and handle to travel through an arc from an open position whereat said fork member and jaw are spaced apart to a closed position whereat said jaw engages a weed upon said fork member, means on said head positioned for engagement with said cleat member to define said open position, said foot being disposed upon its cleat member so that a forward end thereof is in engagement with said surface when said jaw is open and said fork member is entered into the turf at the start of extraction of a weed, said lower part of said cleat member having a length such that when said jaw and fork member are in said open position, said forward end of said foot and said outer end of said head lie in a plane substantially perpendicular to the longitudinal axis of said head, said outer end of said jaw member in open position lying above said plane.

References Cited in the file of this patent

UNITED STATES PATENTS

| | | |
|---|---|---|
| 919,748 | Nason | Apr. 27, 1909 |
| 1,245,920 | Hinthorn | Nov. 6, 1917 |
| 1,640,732 | Simpson | Aug. 30, 1927 |
| 1,751,481 | La Tourrette | Mar. 25, 1930 |
| 1,814,216 | Hartwell | July 14, 1931 |
| 1,945,311 | Gustafson | Jan. 30, 1934 |
| 2,349,621 | Hardman | May 23, 1944 |
| 2,394,568 | Stewart | Feb. 12, 1946 |
| 2,448,445 | Krupp et al. | Aug. 31, 1948 |
| 2,749,088 | Jennens | June 5, 1956 |
| 2,901,280 | Hall | Aug. 25, 1959 |

FOREIGN PATENTS

| | | |
|---|---|---|
| 942 | Great Britain | Mar. 15, 1890 |